United States Patent [19]

Yoshino et al.

[11] 4,128,390
[45] Dec. 5, 1978

[54] FUEL VAPORIZER AND BURNER UNIT FOR SPACE HEATER

[75] Inventors: Masataka Yoshino; Nobuyoshi Matsuno; Hiroyasu Kuwazawa, all of Nakatsugawa; Tomatsu Nomaguchi, Amagasaki, all of Japan

[73] Assignee: Mitsubishi Denki Kabushiki Kaisha, Tokyo, Japan

[21] Appl. No.: 803,913

[22] Filed: Jun. 6, 1977

[30] Foreign Application Priority Data

Jun. 9, 1976 [JP] Japan .................................. 51-67435

[51] Int. Cl.² ............................................. F23D 11/44
[52] U.S. Cl. .................................. 431/242; 431/207; 431/208
[58] Field of Search ................ 431/207, 208, 242, 11, 431/328

[56] References Cited

U.S. PATENT DOCUMENTS

| | | | |
|---|---|---|---|
| 1,344,333 | 6/1920 | Clouston | 431/242 X |
| 2,988,887 | 6/1961 | Milliken | 431/208 X |
| 3,254,695 | 6/1966 | Brodlin | 431/328 |

FOREIGN PATENT DOCUMENTS

784267  4/1935  France ...................................... 431/208

*Primary Examiner*—Edward G. Favors
*Attorney, Agent, or Firm*—Sughrue, Rothwell, Mion, Zinn and Macpeak

[57] ABSTRACT

A vaporizer and burner unit for an oil or kerosene space heater comprises three elongated, vertically stacked fuel mixture flow chambers A, B and C respectively defined between a lower U-shaped frame member 19b and the sloping bottom wall 26 of a flanged, upper U-shaped frame member 19a nested on the lower member, between the wall 26 and an inverted V-shaped pressure plate 27 having a plurality of fuel mixture feed holes 28 therein, and between the plate 27 and a burner plate 30 having a plurality of flame slits 31 therein. Fuel is fed into one end of the chamber A onto a heated vaporizer block 21, and combustion air blown in through a side window 24 adjacent the block and through a concentric gap 25 around the fuel supply line 12 mixes with the vaporized fuel and flows down chamber A and into chamber B through an end opening 29. The mixture then disperses through the holes 28 into chamber C and through the flame slits 31 to a spark igniter 62. Secondary combustion air is blown up through holes 32 in the upper frame member flanges and funneled into the flames by converging guide plates 33 mounted on the flanges. The zig-zag flow chamber arrangement implements thorough fuel-air mixture and preheating, and the holes 28 and 32 are staggered with respect to the slits 31 to promote uniform and complete combustion.

8 Claims, 7 Drawing Figures

FUEL VAPORIZER AND BURNER UNIT FOR SPACE HEATER

BACKGROUND OF THE INVENTION

This invention relates to a liquid fuel vaporizer and burner unit for a room air space heater wherein primary combustion air is mixed and preheated with the vaporized fuel and secondary combustion air is force fed to the ignited mixture.

Liquid fuel burners are known wherein the fuel, such as kerosene, is supplied to a rotary splash or scattering plate and thrown thereby against a heated vaporization surface. Force fed combustion air, supplied by a blower or the like, is mixed with the vaporized fuel and jetted through flame holes in a burner plate into a combustion chamber, where the mixture is ignited.

In such conventional burners, however, the premixing distance for the combustible fuel-air mixture is relatively short, whereby uniform pre-combustion mixing is inhibited and incomplete, and inefficient burning results. To overcome this difficulty it is necessary to specially design the flame holes in the burner plate, which renders them susceptible to carbon clogging and impairs the heating capacity of the device. Furthermore, since the fuel scatterer comprises a rotary plate and the vaporization surface completely surrounds it, the configuration of the conventional device is generally bulky and inconvenient, which imposes a severe limitation on its use and attractiveness in the average room. Examples of such prior art devices are found in U.S. Pat. No. 3,964,859 and U.S. patent application No. 600,378 filed on July 30, 1975 now U.S. Pat. No. 4,045,159.

SUMMARY OF THE INVENTION

These drawbacks and disadvantages are effectively overcome by the present invention, according to which a vaporizer and burner unit for an oil or kerosene space heater comprises three elongated, vertically stacked fuel mixture flow chambers respectively defined between a lower U-shaped frame member and the sloping bottom wall of a flanged, upper U-shaped frame member nested on the lower member, between the wall and an inverted V-shaped pressure plate having a plurality of fuel mixture feed holes therein, and between the pressure plate and a burner plate having a plurality of flame slits therein. Fuel is fed into one end of the lower chamber onto a heated vaporizer block, and combustion air blown in through a side window adjacent the block and through a concentric gap around the fuel supply line mixes with the vaporized fuel and flows down the lower chamber and into the intermediate chamber through an end opening. The mixture then disperses through the pressure plate holes into the upper chamber and through the flame slits in the burner plate to a spark igniter. Secondary combustion air is blown up through holes in the upper frame member flanges and funneled into the flames by converging guide plates mounted on the flanges. The zig-zag flow chamber arrangement implements thorough fuel-air mixture and preheating, and the holes in the pressure plate flanges are staggered with respect to the flame slits to promote uniform and complete combustion.

The overall structural arrangement enables the heater to be constructed with a relatively thin or flat configuration, which makes it particularly attractive for home use in terms of positional adaptability, space requirements, and general appearance.

Further features include a thin insulating layer of heat resistant synthetic resin coated on the surface of the heated vaporizer block to improve the affinity of the liquid fuel for the block surface and promote smooth and steady vaporization, and the feed holes in the pressure plate being smaller at the ends thereof to provide a more uniform fuel mixture delivery. In addition, the primary combustion air blown in through the concentric gap surrounding the fuel supply line serves to cool the latter and prevent any carbide deposition therein, and to implement more thorough mixing and circulation of the air blown in through the side window, which is preheated by its lateral impingement against the hot walls of the lower flow chamber.

DETAILED DESCRIPTION OF THE PREFERRED EMBODIMENT

Figure 1:
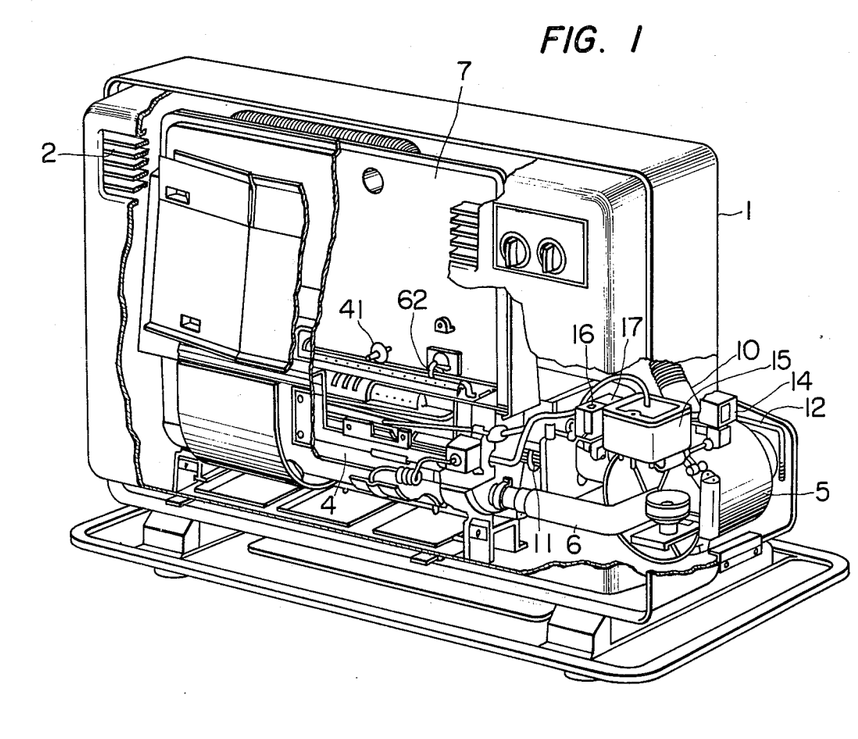
FIG. 1 shows a perspective view, with parts cut away, of a hot air heating apparatus for home use incorporating a vaporization type liquid fuel burner according to the invention.
Figure 2:
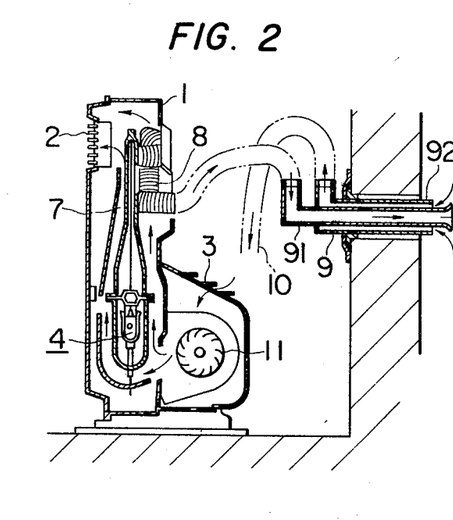
FIG. 2 shows a sectional view of the apparatus of FIG. 1.

Referring now to FIGS. 1 and 2, a hot air heating apparatus body 1 has a hot air blower outlet 2 on its upper front part and a room air suction inlet 3 on its lower rear part. A liquid fuel vaporizer and burner unit 4 is provided in the lower portion of the body 1 together with a blower 5 for supplying air thereto through a duct 6, and a heat exchanger 7 is provided above the burner unit to allow hot gas to rise therethrough. The heat exchanger is made of aluminized steel plate in the form of a relatively flattened cylinder. A stainless steel exhaust pipe 8 is connected between the upper part of the heat exchanger and a dual pipe 9 which penetrates through a room wall. The exhaust gas is discharged outside the room through the inner pipe 91 of the dual pipe. A suction pipe 10 is connected between the outer pipe 92 of the dual pipe and the inlet of the blower 5.

An air circulating blower 11 is mounted in the rear of the body 1, and operates to suck in room air, circulate it around the burner unit 4 and the heat exchanger 7, and blow the heated air out through the outlet 2.

Figure 3:
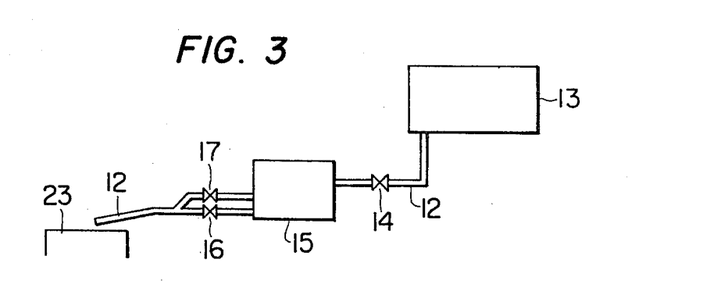
FIG. 3 shows a schematic diagram for describing the fuel path in the apparatus of FIGS. 1 and 2.

A fuel supply line 12 is connected, as shown in FIG. 3, between a kerosene tank 13 and a vaporization surface 23 of the burner unit through an electromagnetic valve 14, a fuel quantity controller 15, and electromagnetic valves 16 and 17.

Figure 4:
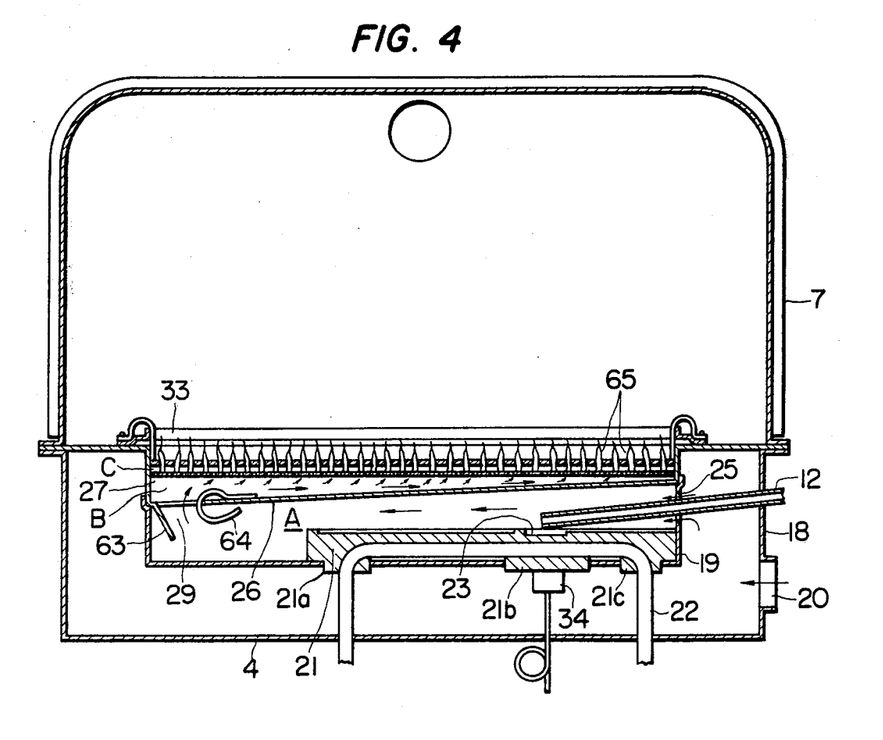
FIG. 4 shows a longitudinal sectional view of the vaporizer and burner unit according to the invention.
Figure 5:
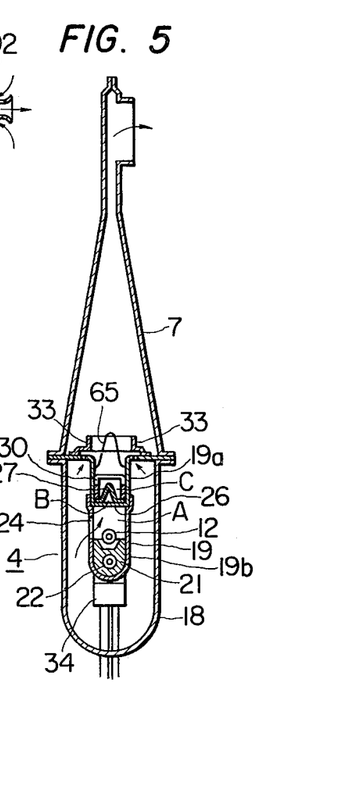
FIG. 5 shows a cross-sectional view of the burner unit shown in FIG. 4.
Figure 6:
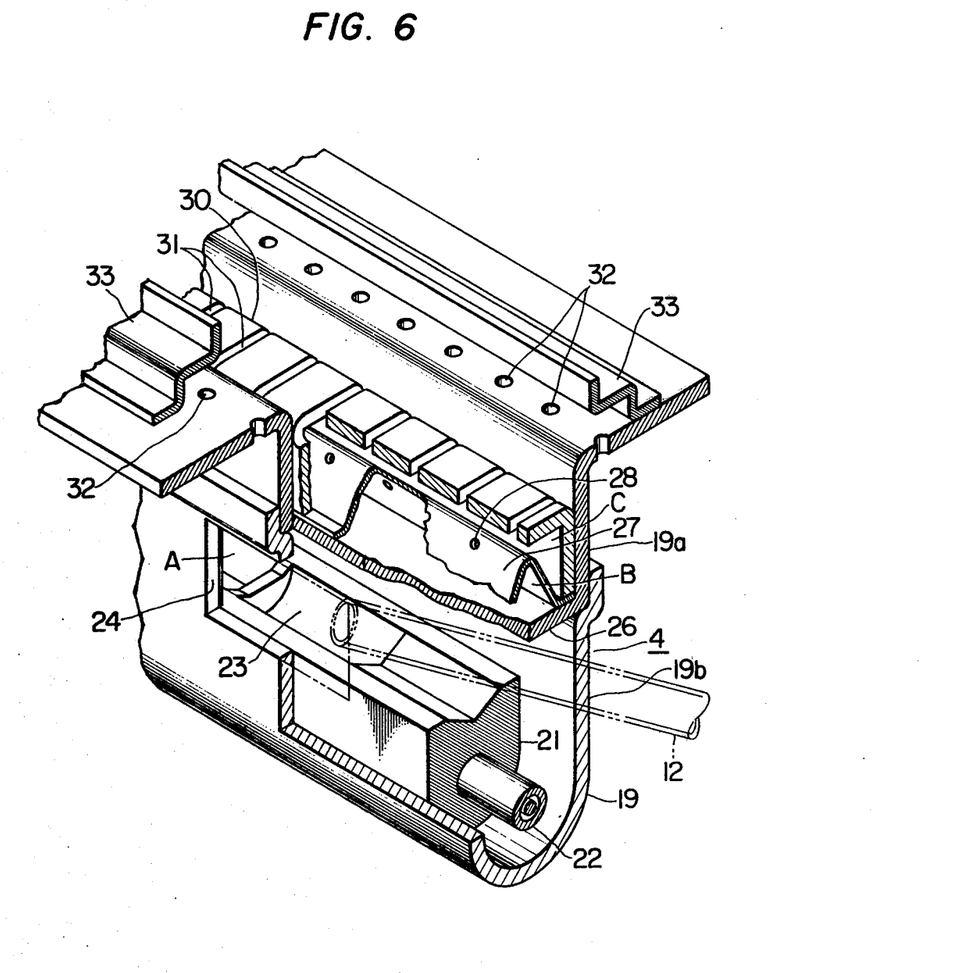
FIG. 6 shows an enlarged perspective view, in partial cutaway, of the burner unit.

Referring to the more detailed showing of the vaporizer and burner unit in FIGS. 4, 5 and 6, an outer case 18 made of aluminized steel plate in the form of a container with an elongated upper opening has a U-shaped cross-section, and an air inlet 20 for receiving air from the blower 5 is provided on one end.

The upper edge of a heat conducting frame 19 is fixed to the case 18 at predetermined intervals, and this frame is made of two aluminized steel plate members 19a and 19b. The frame has a U-shape formed by inserting the upper member 19a into the lower member 19b and welding the junctions therebetween. The bottom wall 26 of member 19a serves as a partition dividing the frame 19 into upper and lower parts. The wall 26 has a gradient of 16 mm/340 mm as it slopes to the left in FIGS. 4 and 6. A uniform triangular pressure plate 27 is disposed above the wall 26, and has a number of small holes 28 therein 2-4 mm in diameter, the central holes being larger than the end holes. A stainless steel flame hole plate 30 of 3 mm thickness is disposed above the pressure plate 27, and has a width of 20 mm and a plurality of flame hole slits 31 1 mm in width at longitudinal intervals of 8 mm.

A first flow chamber A is formed between the member 19a and the bottom wall of the member 19b, a second flow chamber B is formed between the bottom wall 26 of the member 19a and the pressure plate 27, and a third flow chamber C is formed between the pressure plate and the flame hole plate 30.

A vaporization block 21 of die cast aluminum is provided in the bottom of the lower member 19b of the frame, and three protrusions 21a, 21b and 21c extend from its bottom surface and are inserted into respective holes in the bottom of the frame 19. A preheater 22 is embedded in the block 21 and extends out through the protrusions 21a and 21c. A recessed vaporizing surface 23 is formed in the upper central portion of the block 21, and its length is about ⅓ of the total length of the block. The vaporizing surface 23 is coated with a heat resisting paint to a thickness of 20–50μ.

A primary air inlet window 24 is provided in the side wall of the frame 19 adjacent the upper part of the vaporizing surface 23. An auxiliary inlet gap 25 for primary air is also provided in the end wall of the frame 19 concentrically surrounding the fuel supply line 12 when it is inserted through the end wall of the frame with its one end above the vaporizing surface 23. The periphery of the gap 25 is spaced about 1 mm from the outer surface of the fuel line. The ratio of air flow between the primary inlet 24 and the auxiliary inlet 25 is approximately 3:1, and air is allowed to flow in at a rate of about 5 m/sec.

An opening 29 is provided at the end of the wall 26 opposite the vaporizing surface, and guide plates 63, 64 are mounted at the mouth of the opening. Guide plate 64 is in the form of a flattened circle, and guide plate 63 extends at a downward angle into the first flow chamber A to smoothly guide the gas-air mixture into the second chamber.

Secondary air blow holes 32 are provided along the two side flanges of the member 19a above the flame hole plate 30 at a distance from the flame hole slits 31 of 11 mm. The holes 32 and 28 (in the pressure plate 27) are staggered with respect to the flame hole slits 31, to thereby promote more uniform fuel mixture supply and combustion. Guide plates 33 are disposed above the two lines of blow holes 32 to funnel the secondary air into the flame path.

A thermostat 34 for the preheater is secured to the central protrusion 21b of the block 21, and reference numeral 65 designates combustion flames formed at the flame holes 31.

Figure 7:
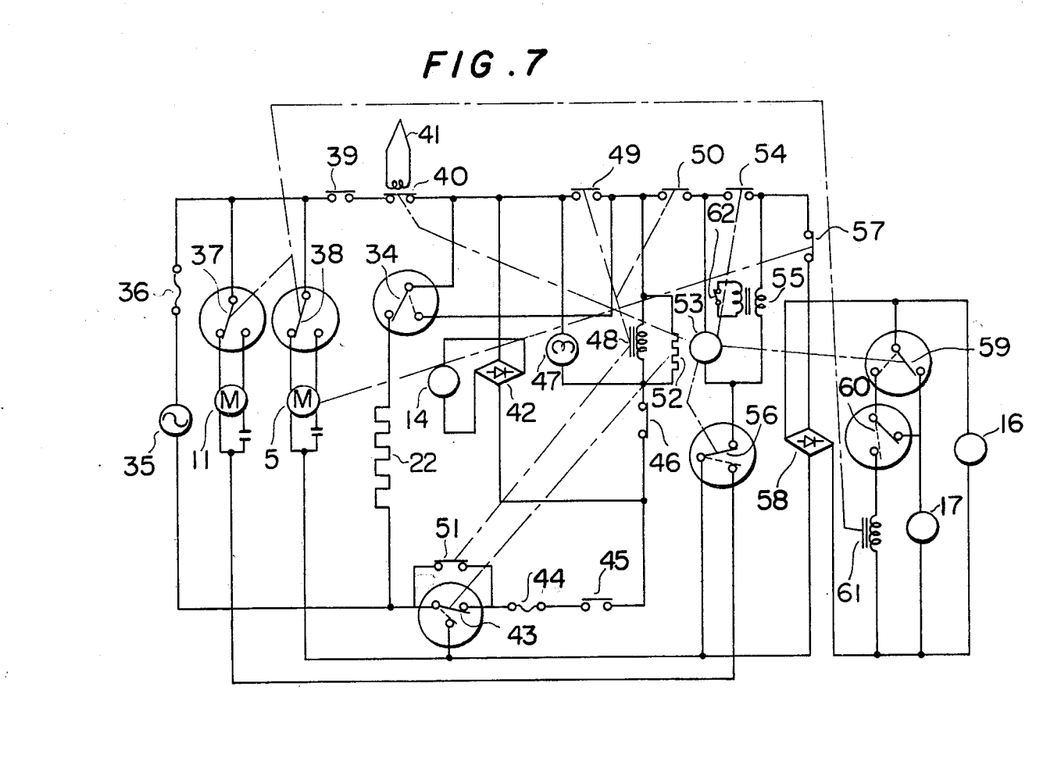
FIG. 7 shows a schematic diagram of an electrical control circuit employed in the heating apparatus.

In the electrical circuit of FIG. 7, reference numerals 35, 36, 37 and 38 designate an alternating electrical source, a power fuse, and speed change switches. The combustion air blower 5 and room air circulating blower 11 are connected through the switches 27 and 28 to the source 35. Reference numeral 39 designates a main switch, 40 is a timer switch, and 41 is a thermocouple for holding the switch 40 closed when flames are detected. The thermostat 34 and sheathed preheater 22 are connected to the switch 40. Reference numeral 42 designates a diode bridge to which the electromagnetic valve 14 is connected, 43 is a bimetal contact switch, 44 is an overheating fuse, 45 is an automatic circuit breaker for preventing overheating, 46 is a vibration-proof switch, 47 is an indicator lamp, and 48 is a first relay for closing associated contacts 49, 50 and 51.

Reference numeral 52 designates a bimetal timer switch, 53 is a timer motor, 54 is a timer pressure switch, 55 is an ignition transformer, 56 is a timer switch, 57 is an air pressure switch, 58 is a diode bridge, 59 is an electromagnetic valve switch, 60 is a room thermostat, and 61 is a second relay.

In operation, when the main switch 39 is closed the switch 40 is closed which energizes the heater 22 through the thermostat 34, whereby the block 21 is heated. When the temperature of the vaporizing surface 23 reaches 250°–300° C., the thermostat 34 transfers as indicated by the dotted line to energize the first relay 48 and the bimetal timer switch 52, whereby contacts 49, 50 and 51 are closed. When the main switch 39 is closed, current also flows through the lamp 47 and the fuel valve 14. When contacts 49 and 50 are closed the combustion air blower 5 is energized through the timer motor 53 and the motor switch 56. Approximately 1 minute after the energization of the bimetal timer switch 52, the armature 43 is transferred as indicated by the dotted line, whereby the energization of the blower 5 is thereafter carried out directly through this armature. Approximately 20 seconds after the energization of the blower 5 switch 54 is operated by the timer motor 53 to energize the ignition transformer 55. The electromagnetic valves 16 and 17 are energized by switch 57 which closes in response to air pressure generated by the blower 5.

As a result, kerosene from the fuel supply line 12 is allowed to drop onto the heated vaporizing surface 23 through valve 14, fuel quantity controller 15, and valves 16 and 17, and is vaporized. The kerosene vapor is mixed with combustion air and flows through the first chamber A below the wall 26 of the member 19a and then up through the second chamber B between the wall 26 and the pressure plate 27. After passing through the small holes 28 in the pressure plate the fuel-air mixture enters the third flow chamber C between the pressure plate and the flame hole plate 30, and is then jetted up through the flame hole slits 31. The fuel-air ratio is 0.5–1.3 times the theoretically optimum value, and this mixture is ignited by sparks from the ignition electrodes 62 of the transformer 55. Secondary air is supplied to the flames through the blow holes 32, and its density is selected to be 1.5 times the density of the primary air.

2 or 3 minutes after combustion is started the switch armatures 56 and 59 are transferred by the timer motor 53 as indicated by the dotted lines. As a result, the ignition transformer 55 is deenergized and the air circulating blower 11 is energized. The air in the room is therefore circulated around the heat exchanger 7, and the hot air is discharged through the outlet 2. When the room temperature exceeds a predetermined value, the armature of the thermostat 60 is tripped to the position indicated by the dotted line. As a result, the electromagnetic valve 17 is closed, and the fuel supply and combustion level is reduced. At the same time, the switches 37 and 38 are transferred by the second relay 61, which slows down the blowers 5 and 11.

With a heating output of 4000 Kcal/h, the quantities of kerosene and air consumed are 0.48 l/h and 0.13 m$^3$/h, respectively.

As is apparent from the above description, the vaporizer and structure has three elongated, vertically stacked flow chambers A, B and C. The heated vaporizing surface 23 is at one end of the first chamber together with the combustion air inlets, and the other end communicates through the opening 29 with one end of the second chamber B, positioned immediately above the first chamber. The entire upper surface of this second chamber is connected through the pressure plate holes 28 to the lower surface of the third chamber C positioned thereabove, the upper surface of the latter is provided with flame hole slits 31 over its entire length, and secondary air holes 32 are provided immediately above the flame hole slits on both sides. This arrangement greatly extends and lengthens the premixing distance so that the combustible vapors are uniformly mixed with air to produce more efficient burning and complete combustion.

The heat resisting and insulating paint layer coated onto the vaporizing surface 23 improves the affinity of the liquid fuel for the surface and implements smooth, non-pulsating vaporization.

The graduated diameters of the holes 28 in the inverted V-shaped pressure plate 27, whereby the holes are smaller in the end portions of the pressure plate, produces higher dynamic pressures at the flow-in end of the second chamber where the combustible gas mixture is delivered from the first chamber and at the far end where the gas mixture passes through the narrowest portion of the second chabmer, whereby the gas mixture is delivered to the third chamber at a uniform pressure over the entire length of the pressure plate.

With the inlet 24 for supplying the primary combustion air disposed in the front side wall of the first chamber, the air enters in a lateral or perpendicular direction and strikes the hot rear side wall of the frame member 19b. In addition, the gap 25 between the fuel supply line and the end wall of the frame 19 serves as an auxiliary inlet for combustion air which implements better preheating and mixture with the vaporized fuel. The inlet 24 can also be used as an access window for cleaning and inspecting the vaporizing surface, and as the fuel supply line is cooled by the air entering through the gap 25 the overheating of the line is avoided and the deposition of carbides on its inner wall is eliminated.

The members 19a and 19b are formed in one unit of a material having high heat conductivity, whereby the flame heat generated in the upper portions is conducted down to the walls of the first chamber to aid in the vaporization of the fuel.

What is claimed is:

1. A vaporizer and burner unit for a liquid fuel space heater, comprising:
   (a) lower, intermediate, and upper elongated fuel mixture flow chambers vertically disposed one above the other, said chambers being of substantially equal lengths,
   (b) a preheated vaporizing block mounted at one end of the lower chamber,
   (c) fuel delivery means disposed proximate the upper surface of the block,
   (d) primary combustion air inlet means disposed proximate the upper surface of the block,
   (e) an opening at the other end of the lower chamber communicating same with the intermediate chamber thereabove, whereby the fuel mixture flow direction is substantially reversed between the lower and intermediate chambers,
   (f) a perforated plate defining the entire upper surface of the intermediate chamber for delivering a fuel mixture therefrom into the upper chamber thereabove at a uniform pressure,
   (g) a burner plate defining the entire upper surface of the upper chamber and having a plurality of spaced flame apertures therein for delivering the fuel mixture therefrom into a combustion chamber thereabove, and
   (h) a plurality of blow holes defined above and along both sides of the burner plate for supplying secondary combustion air to the combustion chamber.

2. A vaporizer and burner unit as defined in claim 1, wherein the fuel delivery means comprises a fuel supply line extending through an end wall of the lower chamber, and the primary combustion air inlet means comprises an opening in a side wall of the lower chamber adjacent the upper surface of the vaporizing block, and a concentric gap in said end wall surrounding the fuel supply line.

3. A vaporizer and burner unit for a liquid fuel space heater, comprising:
   (a) lower, intermediate, and upper elongated fuel mixture flow chambers vertically disposed one above the other,
   (b) a preheated vaporizing block mounted at one end of the lower chamber,
   (c) fuel delivery means disposed proximate the upper surface of the block,
   (d) primary combustion air inlet means disposed proximate the upper surface of the block,
   (e) an opening at the other end of the lower chamber communicating same with the intermediate chamber thereabove,
   (f) a perforated pla te defining the entire upper surface of the intermediate chamber for delivering a fuel mixture therefrom into the upper chamber thereabove at a uniform pressure,
   (g) a burner plate defining the entire upper surface of the upper chamber and having a plurality of spaced flame apertures therein for delivering the fuel mixture therefrom into a combustion chamber thereabove,
   (h) a plurality of blow holes defined above and along both sides of the burner plate for supplying secondary combustion air to the combustion chamber, and
   (i) a layer of insulating and heat resistant synthetic resin paint coated on the upper surface of the vaporizing block to a thickness of 20-50 μ.

4. A vaporizer and burner unit for a liquid fuel space heater, comprising:
   (a) lower, intermediate, and upper elongated fuel mixture flow chambers vertically disposed one above the other,
   (b) a preheated vaporizing block mounted at one end of the lower chamber,
   (c) fuel delivery means disposed proximate the upper surface of the block, (d) primary combustion air inlet means disposed proximate the upper surface of the block,
(e) an opening at the other end of the lower chamber communicating same with the intermediate chamber thereabove,
(f) a perforated plate defining the entire upper surface of the intermediate chamber for delivering a fuel mixture therefrom into the upper chamber thereabove at a uniform pressure,
(g) a burner plate defining the entire upper surface of the upper chamber and having a plurality of spaced flame apertures therein for delivering the fuel mixture therefrom into a combustion chamber thereabove, and
(h) a plurality of blow holes defined above and along both sides of the burner plate for supplying secondary combustion air to the combustion chamber,
(i) wherein the perforated plate has an inverted V-shape and a plurality of holes are uniformly provided in both sloping surfaces thereof, the diameters of the holes being smaller at the end portions of the plate than in the center portion thereof.

5. A vaporizer and burner unit for a liquid fuel space heater, comprising:
(a) lower, intermediate, and upper elongated fuel mixture flow chambers vertically disposed one above the other,
(b) a preheated vaporizing block mounted at one end of the lower chamber,
(c) fuel delivery means disposed proximate the upper surfface of the block,
(d) primary combustion air inlet means disposed proximate the upper surface of the block,
(e) an opening at the other end of the lower chamber communicating same with the intermediate chamber thereabove,
(f) a perforated plate defining the entire upper surface of the intermediate chamber for delivering a fuel mixture therefrom into the upper chamber thereabove at a uniform pressure,
(g) a burner plate defining the entire upper surface of the upper chamber and having a plurality of spaced flame apertures therein for delivering the fuel mixture therefrom into a combustion chamber thereabove,
(h) a plurality of blow holes defined above and along both sides of the burner plate for supplying secondary combustion air to the combustion chamber,
(i) a pair of guide plates disposed at the opening communicating the lower and intermediate chambers, one of said guide plates being generally rounded and mounted at the innermost edge of the opening and the other of said guide plates being generally planar and extending obliquely downwardly into the lower chamber from the outermost edge of the opening.

6. A vaporizer and burner unit for a liquid fuel space heater, comprising:
(a) lower, intermediate, and upper elongated fuel mixture flow chambers vertically disposed one above the other,
(b) a preheated vaporizing block mounted at one end of the lower chamber,
(c) fuel delivery means disposed proximate the upper surface of the block,
(d) primary combustion air inlet means disposed proximate the upper surface of the block,
(e) an opening at the other end of the lower chamber communicating same with the intermediate chamber thereabove,
(f) a perforated plate defining the entire upper surface of the intermediate chamber for delivering a fuel mixture therefrom into the upper chamber thereabove at a uniform pressure,
(g) a burner plate defining the entire upper surface of the upper chamber and having a plurality of spaced flame apertures therein for delivering the fuel mixture therefrom into a combustion chamber thereabove,
(h) a plurality of blow holes defined above and along both sides of the burner plate for supplying secondary combustion air to the combustion chamber, and
(i) a pair of inwardly converging baffle plates individually disposed above the blow holes on both sides of the burner plate for directing the secondary combustion air inwardly toward the flame apertures.

7. A vaporizer and burner unit for a liquid fuel space heater, comprising:
(a) lower, intermediate, and upper elongated fuel mixture flow chambers vertically disposed one above the other,
(b) a preheated vaporizing block mounted at one end of the lower chamber,
(c) fuel delivery means disposed proximate the upper surface of the block,
(d) primary combustion air inlet means disposed proximate the upper surface of the block,
(e) an opening at the other end of the lower chamber communicating same with the intermediate chamber thereabove,
(f) a perforated plate defining the entire upper surface of the intermediate chamber for delivering a fuel mixture therefrom into the upper chamber thereabove at a uniform pressure,
(g) a burner plate defining the entire upper surface of the upper chamber and having a plurality of spaced flame apertures therein for delivering the fuel mixture therefrom into a combustion chamber thereabove, and
(h) a plurality of blow holes defined above and along both sides of the burner plate for supplying secondary combustion air to the combustion chamber,
(i) wherein the peripheral walls defining the respective chambers have a high coefficient of thermal conductivity and are assembled into a single unit, the side walls of the upper chamber extend upwardly beyond the burner plate and are outwardly flanged, and the blow holes are defined in said flanged side walls.

8. A vaporizer and burner unit for a liquid fuel space heater, comprising:
(a) lower, intermediate, and upper elongated fuel mixture flow chambers vertically disposed one above the other,
(b) a preheated vaporizing block mounted at one end of the lower chamber,
(c) fuel delivery means disposed proximate the upper surface of the block,
(d) primary combustion air inlet means disposed proximate the upper surface of the block,
(e) an opening at the other end of the lower chamber communicating same with the intermediate chamber thereabove, (f) a perforated plate defining the entire upper surface of the intermediate chamber for delivering a fuel mixture therefrom into the upper chamber thereabove at a uniform pressure, (g) a burner plate defining the entire upper surface of the upper chamber and having a plurality of spaced flame apertures therein for delivering the fuel mixture therefrom into a combustion chamber thereabove, and (h) a plurality of blow holes defined above and along both sides of the burner plate for supplying secondary combustion air to the combustion chamber, (i) wherein the fuel mixture delivery holes in the perforated plate, the frame apertures, and the blow holes are longitudinally staggered relative to each other.

* * * * *